US005680760A

United States Patent [19]

Lunzman

[11] Patent Number: 5,680,760

[45] Date of Patent: Oct. 28, 1997

[54] HYDRAULIC DRIVE SYSTEM

[75] Inventor: Stephen V. Lunzman, Chillicothe, Ill.

[73] Assignee: Caterpillar Inc., Peoria, Ill.

[21] Appl. No.: 623,073

[22] Filed: Mar. 28, 1996

[51] Int. Cl.$^{6}$ .......................... F16D 31/02

[52] U.S. Cl. .......................... 60/426; 60/452; 60/468; 60/494

[58] Field of Search .......................... 60/420, 426, 452, 60/459, 468, 494; 91/517, 518

[56] References Cited

U.S. PATENT DOCUMENTS

| | | | |
|---|---|---|---|
| 5,129,230 | 7/1992 | Izumi et al. | 60/452 |
| 5,297,381 | 3/1994 | Eich et al. | 91/518 X |
| 5,394,697 | 3/1995 | Hirata | 60/426 |
| 5,537,819 | 7/1996 | Kobayashi | 60/468 X |

*Primary Examiner*—Hoang Nguyen

*Attorney, Agent, or Firm*—Calvin E. Glastetter

[57] ABSTRACT

A hydraulic drive system for a construction machine includes a pump for delivering fluid under pressure from a fluid reservoir, at least one hydraulic actuator selectively driven by the pressurized fluid, and at least one closed-center directional control valve connected in parallel to the pump. The control valve has an "off" position which blocks fluid flow therethrough and at least one "on" position for controlling the flow of fluid to the hydraulic actuator. A control device generates a signal for actuation of the hydraulic actuator. A control unit receives the control device signal for operating the control valve associated with the hydraulic actuator. A bypass line leads from the pump back to the reservoir. A variable position bypass valve is interposed in the bypass line and controls flow through the bypass line. The control unit modulates the bypass valve for optimum operation. A hybrid control senses pressure in the actuator and modifies the control signal in response to the load pressure.

3 Claims, 2 Drawing Sheets

10
11
20
19
C
P
18
R
47
14
Press. Sensor
48
24
23
22
46
16
31
30
29
28
27
26
50
13
52
14
54
Microprocessor
43s
42s
44s
41s
34
56
45s
40s
38
36
37
39
12

HYDRAULIC DRIVE SYSTEM

TECHNICAL FIELD

The present invention relates generally to fluid systems and more particularly to a hydraulic drive system for a construction machine or the like.

BACKGROUND ART

Hydraulic drive systems are utilized in construction machines such as hydraulic excavators, backhoe loaders and end loaders. The machines are usually mobile having either wheels or tracks. Sometimes the equipment is stationary or mounted on some other vehicle such as a rail car.

Known systems use a plurality of open-center valves in which flow from the pump is bypassed to the tank by flowing sequentially through each valve and a restrictor, and then on to the tank. The pressure developed ahead of the restrictor is used to control pump flow such that flow increases as the pressure signal decreases.

Different hydraulic drive systems use a plurality of closed-center valves, and an ordinary two-position bypass valve; all under control of a control unit.

It is desirable to have a drive system which utilizes closed-center valves but which can operate as if it where a system having open-center valves providing a means for bypassing flow.

DISCLOSURE OF THE INVENTION

In one aspect of the present invention there is provided a hydraulic drive system for a construction machine comprising a pump for delivering fluid under pressure. At least one hydraulic actuator is driven by the pressurized fluid. At least one closed-center directional control valve is connected to the pump, and has an "off" position which blocks fluid flow therethrough and at least one "on" position for controlling the flow of fluid to the hydraulic actuator. At least one control device for generating a signal for the hydraulic actuator. A control unit is responsive to the control device signal for operating the control valve. All fluid flow through the control valve is blocked in the "off" position. A bypass line leads from the pump back to the reservoir. A variable position bypass valve is interposed in the bypass line. Means is provided for modulating the bypass valve. A hybrid control senses load pressure and modifies the control signal in response to the load pressure.

The present invention provides a hydraulic drive system having a hybrid control which senses the pressure within a circuit and modifies the pressure setting in the drive system relative to the sensed pressure value.

BEST MODE FOR CARRYING OUT THE INVENTION

Figure 1:
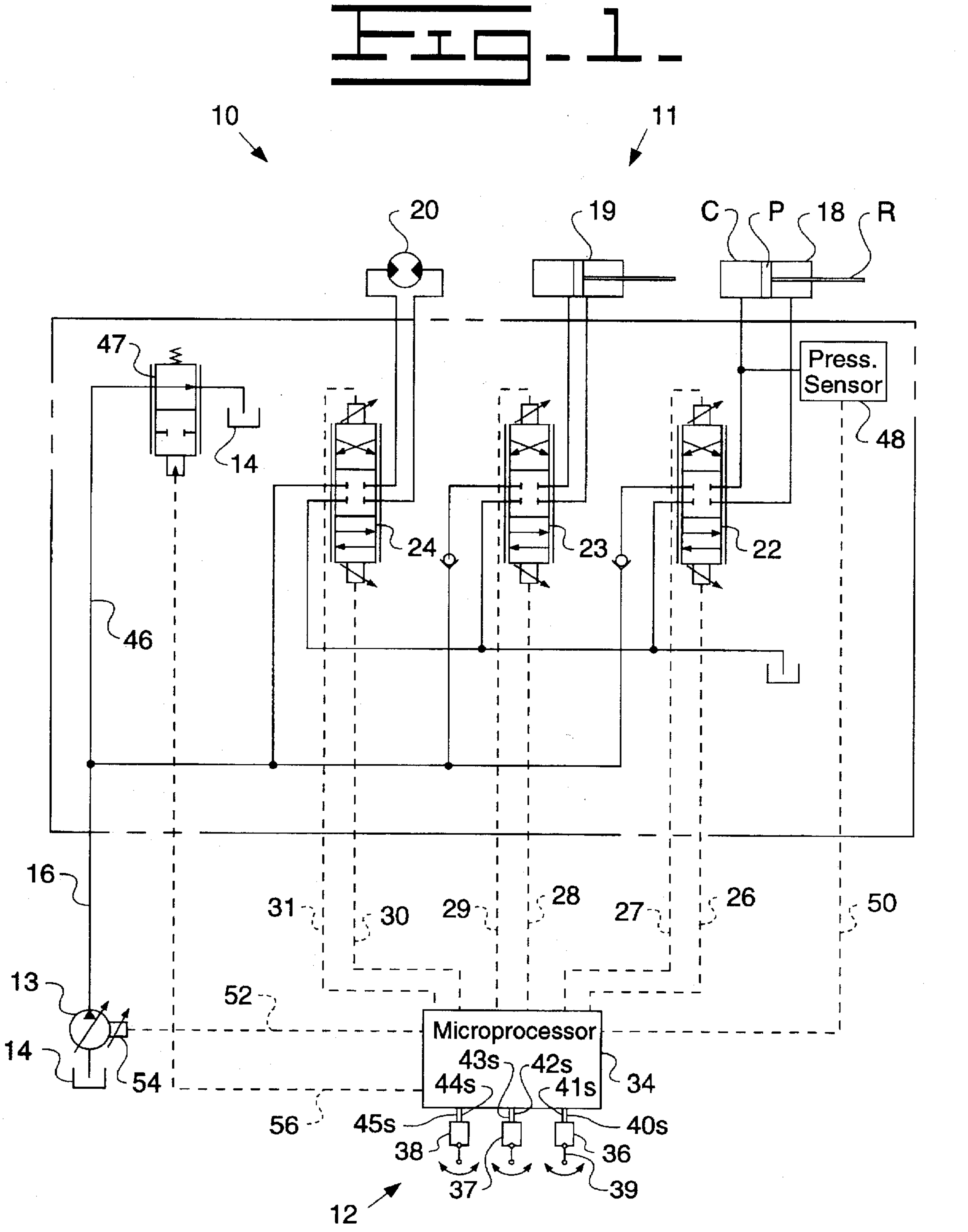
FIG. 1 is a schematic of a hydraulic system of the present invention.

Referring to FIG. 1, a hydraulic drive system 10 is shown in association with a hydraulic circuit 11 and a electrical control system 12. The hydraulic circuit includes a variable displacement hydraulic pump 13 for delivering fluid under pressure from a fluid reservoir 14 to a supply line 16, and at least three hydraulic actuators 18–20. At least three variable or infinite positioning directional control valves 22–24 are connected to the supply line 16 and are operative to control flow of the hydraulic fluid to a respective actuator 18–20. Each of the control valves 22–24 is of the closed-center type and is preferably pilot operated in a conventional electro-hydraulic manner. Each of the control valves 22–24 is solenoid proportional controlled and actuated by a plurality of electrical signals 26–31 generated by a control unit or microprocessor 34 of the electrical control system 12,as hereafter described. At least three manually operated control devices 36–38 generate input signals 40S–45S which are fed to the control unit 34 to operate the control valves 22–24. The control device may be electronic joysticks having a lever 39 and/or peddles.

A bypass line 46, connected to the supply line 16, is provided to return hydraulic fluid to the reservoir 14. An infinite positioning bypass valve 47 is interposed in the bypass line 46 and is controlled by the control unit 34 as described below.

A pressure sensor 48 is provided for sensing pressure in the actuator 18. In this embodiment the sensor 48 senses pressure in the head-end of the actuator 18, however the sensor could be used to sense pressure in the rod-end of the actuator without departing from the scope of the invention. An electrical signal 50 is sent from the pressure sensor 48 to the control unit 34. An electrical signal 52 is sent from the control unit 34 to a pump controller 54 to control pump pressure. An electrical signal 56 is sent from the control unit 34 to the bypass valve 47 to control the bypass valve 47.

In operation, when the system 10 is idling (i.e. there is little or no usage by the actuators 18–20), bypass valve 47 is fully open to allow fluid flow through the bypass line 46. When, as an example, actuator 18 is actuated by movement of the control valve 22 the signal 56 is sent from the control unit 34 to the bypass valve 47 to move the bypass valve 47 toward the closed position thus increasing the pressure in the line 16. The signal 52 is also sent to the pump controller 54 to increase fluid flow from the pump 13. The bypass valve 47 is modulated and controlled by the position of the control devices 36–38 to provide operation of the closed-center valves 22–24 as if the system were one having open-center valves.

Figure 2:
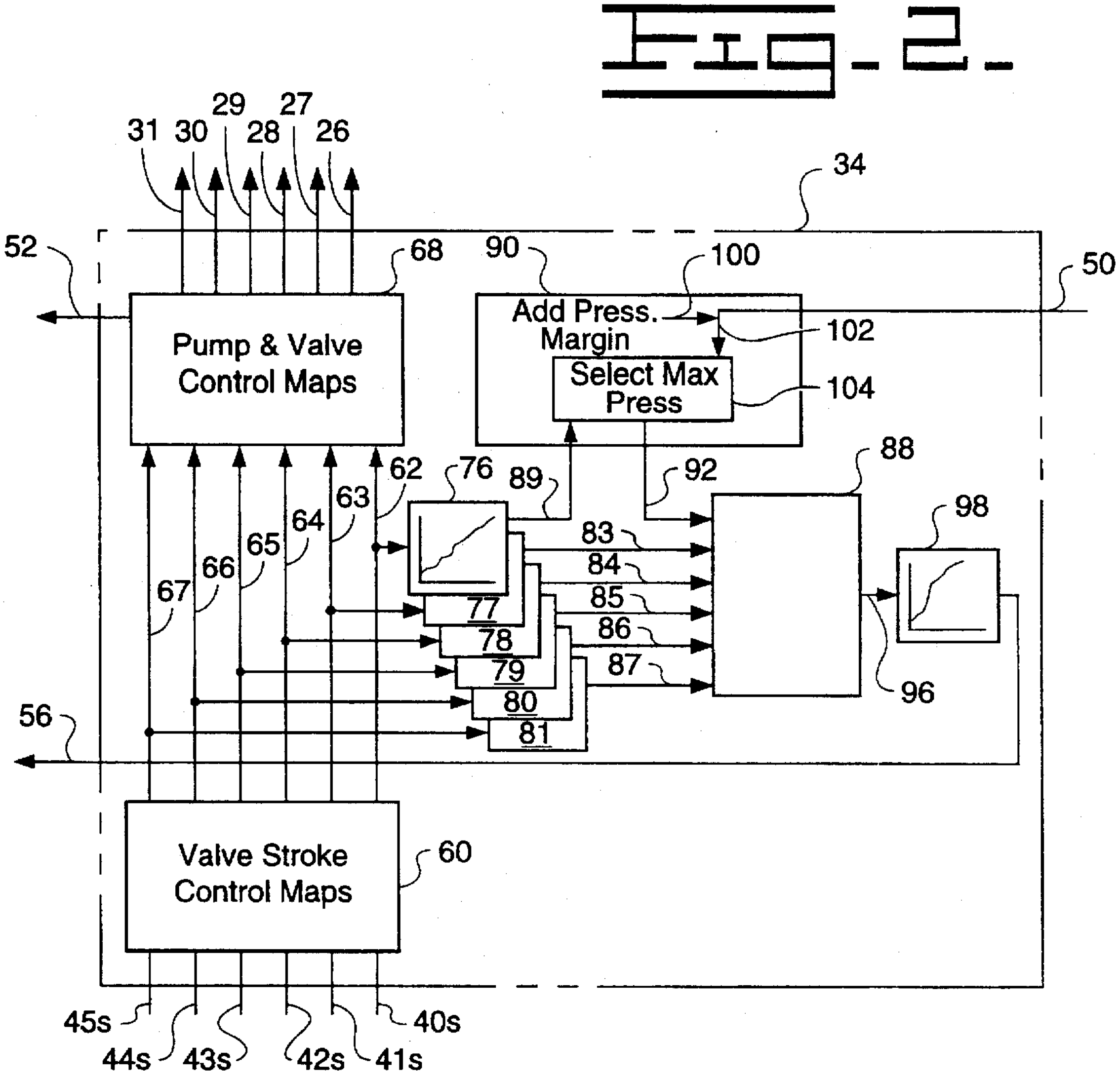
FIG. 2 is a diagrammatic illustration of the control unit.

Referring to FIG. 2, the electrical control system 12 will be described. The control unit 34 includes a module 60 which receives the control signals 40S–45S which are dependent on the position of the control devices 36–38. The control signals 40S–45S will be compared to control maps, not shown, within the module 60 and a plurality of spool stroke command signals 62–67 will be sent to a module 68. Module 68 will compare the spool stroke command signals 62–67 to control maps, not shown, within the module 68 and will send the plurality of actuation command signals 26–31 to control the valves 22–24 and also send the electrical signal 52 to the pump controller 54. The spool stroke command signals 62–67, in addition to being sent to the module 68, will also be sent to a plurality of pressure modulation maps 76–81.

A plurality of pressure signals 83–87 from the modulation maps 77–81 are sent to a module 88. A pressure signal 89 from the modulation map 76 is sent to a hybrid control module 90, which will be described later, and a pressure signal 92 is sent from the hybrid control module 90 to the module 88. The hybrid control module 90 insures that the signal 92 is greater than the actuator load pressure so that the deadband of the lever 39 does not increase as load pressure increases. The module 88 will process the pressure signals 83–87, 89 and send a signal 96 to a map 98 for controlling the bypass valve 47 by a the signal 56. The module 88 can be constructed to select the maximum pressure of the signals 83–87 and 92, sum all the signal pressures, or any other suitable math function, and this will be sent to the map 98 by the signal 96.

The hybrid control 90 receives the electrical signal 50 from the pressure sensor 48 and adds a predetermined pressure margin 100. In this embodiment the pressure margin is about 2000 kPa, however this can be changed without departing from the scope of the invention. A combined signal 102 is then sent to a module 104. The module 104 receives the combined signal 102 and the signal 89 and selects the signal having the higher pressure and sends this as the signal 92 to the module 88.

The hybrid control 90 is shown as only being positioned between the modulation map 76 and the module 88, however a similar hybrid control could be used between the other modulation maps 77–81 and the module 88 without departing from the scope of the invention.

Figure 3:
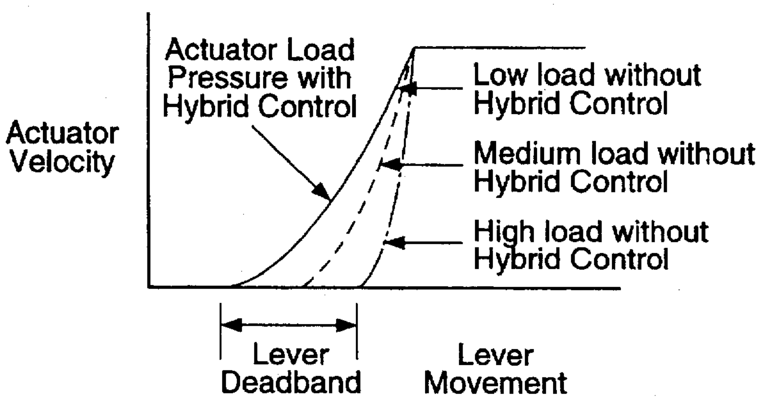
FIG. 3 is a diagrammatic illustration of a graph showing the lever movement and actuator velocity.

Referring to FIG. 3, the load pressure curve is shown by a solid line relative to lever movement and actuator velocity. The solid line represents the load pressure using the hybrid control in all load conditions and also represents what the low load condition in a conventional system. When using the hybrid control the lever deadband does not increase as the load pressure increases, thus maintaining lever deadband which allows for more precise control of the actuator by maintaining the same pressure curve throughout the various load conditions. In a medium load condition without the hybrid control, as shown by a dashed line, a larger lever movement is required to start movement of the actuator and the angle of the load curve is greater. In a high load condition without the hybrid control, as shown by a phantom line, a still larger lever movement is required to start movement of the actuator and the angle of the load curve is greater.

Industrial Applicability

The system 10 is advantageously used in construction machines such as hydraulic excavators, backhoe loaders and end loaders. In a hydraulic excavator, for example, hydraulic actuator 20 maybe a travel motor in the form of a rotatory hydraulic motor. For this purpose, the control valve 24 has a free wheeling position which is the operative position shown in FIG. 1. While a single travel motor is shown, two or more motors could be used without departing from the present invention. Hydraulic actuator 18 maybe a hydraulic boom cylinder, in the form of a hydraulic ram. As diagrammatically illustrated in FIG. 1, the hydraulic ram includes a piston P mounted in a cylinder C for reciprocation therein, and at least one piston rod R connected to the piston and extending out of the cylinder C. The hydraulic system 10 complete with the pump 13 and directional control valves 22–24 may be under the control of the control unit 34 and supplies fluid to the actuators 18–20. The control unit 34 will control the pump pressure and bypass valve flow as a function of the input signal **40*s*–45*s* which corresponds to the position of the control devices 36–38. As the control device 36 is moved the input signals 40*s* and 41*s* are sent to the control unit 34. In response to the input signals 40*s*, 41*s* the control unit 34 will send the signals 26, 27 to the control valve 22 to actuate the actuator 18. The control unit 34 will also send the signal 52 to control the pump and the signal 56 to control the bypass valve 47. If the actuator 18 is operating normally, not stalled against a heavy load, the control unit 34 will maintain pump pressure equal to, or less than the pressure modulation map 76 value. The hybrid control 90 receives the signal 50 from the pressure sensor 48 and the signal 89 from the pressure modulation map 76 and selects the higher pressure reading to control the bypass valve 47, for example if the actuator 18** was stalled or moving against a heavy load.

It is now deemed apparent that the drive system as described will replace main open-center valves and also modify system pressure when a stalled condition is sensed. This system of closed-center valves will reduce the size, cost and complexity of the main control valves and allows adjustment independent of the valve spools. The use of the hybrid control will maintain the lever deadband as the actuator load pressure increases which will allow more precise control of the actuator.

Other aspects, features and advantages can be understood from a study of this disclosure, the drawings and the appended claims.

I claim:

1. A hydraulic drive system for a construction machine having a pump for delivering fluid under pressure from a fluid reservoir; at least one hydraulic actuator selectively driven by the pressurized fluid; at least one closed-center directional control valve connected in parallel to the pump, and having an "off" position which blocks fluid flow therethrough and at least one "on" position for controlling the flow of fluid to the hydraulic actuator; at least one control device for generating a signal for the hydraulic actuator; a control unit responsive to the control device signal for operating the control valve, the control unit includes a pressure map which defines what the pump pressure will be relative to the position of the control device, a second pressure map which modifies the pump pressure relative to the sensed load pressure and means for selecting the modified pump pressure; a bypass line leading from the pump back to the reservoir; an infinite positioning bypass valve interposed in the bypass line; and a hybrid control which senses load pressure of the hydraulic actuator and modifies a control signal in response to the load pressure.

2. The hydraulic drive system of claim 1 wherein the hybrid control senses pressure in the actuator to increase pump pressure to a level greater than actuator pressure.

3. The hydraulic drive system of claim 2 wherein the hybrid control modifies the pump pressure signal between the first pressure map and the selecting means when the actuator pressure is greater than the modulation map pressure signal.

* * * * *